US006705703B2

(12) United States Patent
Zeng et al.

(10) Patent No.: US 6,705,703 B2
(45) Date of Patent: Mar. 16, 2004

(54) DETERMINATION OF CONTROL POINTS FOR CONSTRUCTION OF FIRST COLOR SPACE-TO-SECOND COLOR SPACE LOOK-UP TABLE

(75) Inventors: Huanzhao Zeng, Vancouver, WA (US); Kevin Hudson, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 85 days.

(21) Appl. No.: 10/131,929

(22) Filed: Apr. 24, 2002

(65) Prior Publication Data

US 2003/0202043 A1 Oct. 30, 2003

(51) Int. Cl.[7] .............................. B41J 2/21; B41J 2/205

(52) U.S. Cl. ............................................ 347/43; 347/15

(58) Field of Search .............................. 347/43, 15, 19; 358/1.9, 527

(56) References Cited

U.S. PATENT DOCUMENTS

| | | | | |
|---|---|---|---|---|
| 4,924,323 A | | 5/1990 | Numakura et al. | 358/456 |
| 5,262,847 A | * | 11/1993 | Rodriguez et al. | 358/527 |
| 5,381,246 A | | 1/1995 | Suzuki et al. | |
| 5,978,011 A | | 11/1999 | Jacob et al. | 347/251 |
| 5,982,990 A | | 11/1999 | Gondek | 395/109 |
| 6,002,408 A | | 12/1999 | Long | 345/431 |
| 6,266,103 B1 | | 7/2001 | Barton et al. | 348/675 |
| 6,323,957 B1 | * | 11/2001 | Ball | 358/1.9 |

FOREIGN PATENT DOCUMENTS

| | | | |
|---|---|---|---|
| GB | 2282723 | 4/1995 | |
| WO | WO 01/29816 | 4/2001 | G09G/5/02 |
| WO | WO02/51127 | 6/2002 | |

* cited by examiner

*Primary Examiner*—Thinh Nguyen

(57) ABSTRACT

Determining the control points for constructing a lookup table from a first color space to a second color space is disclosed. Black and white control points are determined based on an allowable total colorant amount and an absence of colorant, respectively. Control points between the black control point and the white control point are determined. A primary control point is determined for each of a number of first and secondary primary colors, based at least on the allowable total colorant amount. Control points between the white control point and the primary control point for each primary color are also determined. Control points between the black control point and the primary control point for each primary color are finally determined.

40 Claims, 6 Drawing Sheets

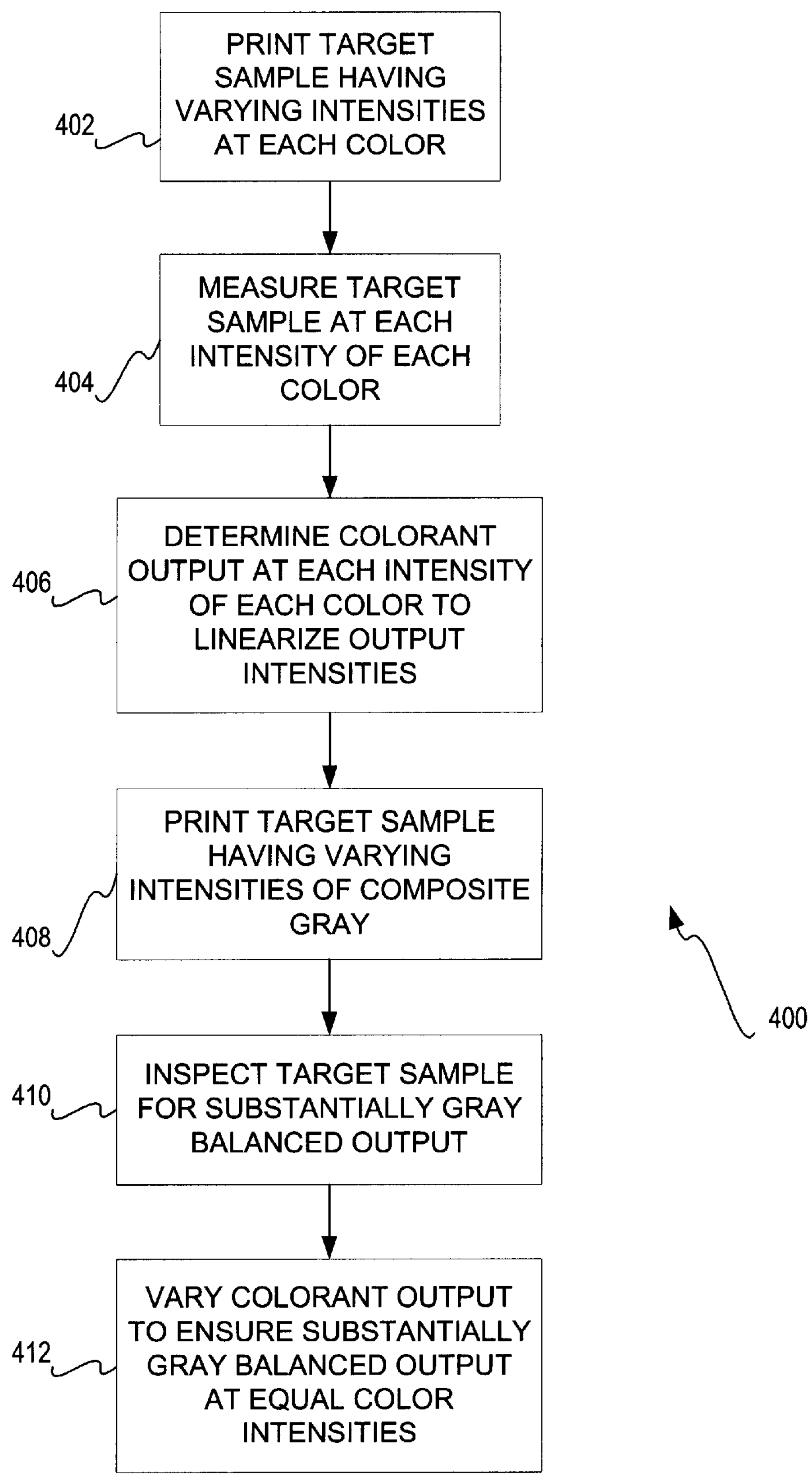
FIG 4
PRINT TARGET SAMPLE HAVING VARYING INTENSITIES AT EACH COLOR
402
MEASURE TARGET SAMPLE AT EACH INTENSITY OF EACH COLOR
404
DETERMINE COLORANT OUTPUT AT EACH INTENSITY OF EACH COLOR TO LINEARIZE OUTPUT INTENSITIES
406
PRINT TARGET SAMPLE HAVING VARYING INTENSITIES OF COMPOSITE GRAY
408
INSPECT TARGET SAMPLE FOR SUBSTANTIALLY GRAY BALANCED OUTPUT
410
VARY COLORANT OUTPUT TO ENSURE SUBSTANTIALLY GRAY BALANCED OUTPUT AT EQUAL COLOR INTENSITIES
412
400

500

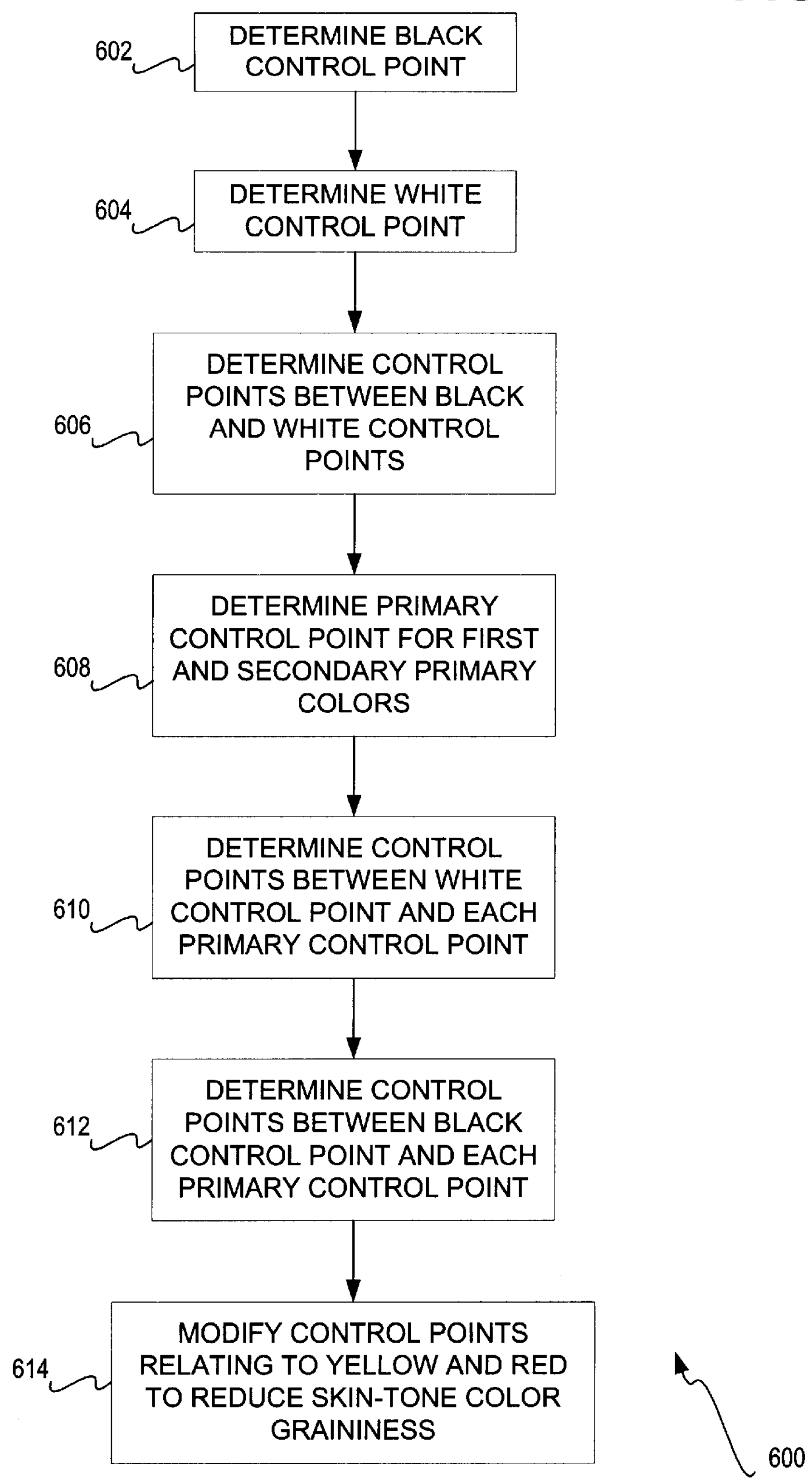
FIG 6
602
DETERMINE BLACK CONTROL POINT
604
DETERMINE WHITE CONTROL POINT
606
DETERMINE CONTROL POINTS BETWEEN BLACK AND WHITE CONTROL POINTS
608
DETERMINE PRIMARY CONTROL POINT FOR FIRST AND SECONDARY PRIMARY COLORS
610
DETERMINE CONTROL POINTS BETWEEN WHITE CONTROL POINT AND EACH PRIMARY CONTROL POINT
612
DETERMINE CONTROL POINTS BETWEEN BLACK CONTROL POINT AND EACH PRIMARY CONTROL POINT
614
MODIFY CONTROL POINTS RELATING TO YELLOW AND RED TO REDUCE SKIN-TONE COLOR GRAININESS
600

DETERMINATION OF CONTROL POINTS FOR CONSTRUCTION OF FIRST COLOR SPACE-TO-SECOND COLOR SPACE LOOK-UP TABLE

BACKGROUND OF THE INVENTION

Printers have become exceedingly popular peripherals for computers and other types of computerized devices. They enable users to print images onto media, most commonly paper. There are many different types of printers, including most popularly inkjet printers and laser printers. Inkjet printers generally operate by ejecting fine droplets of ink onto the media, whereas laser printers generally operate by fusing toner onto the media. Either type of printer may be a black and white-only printer, or a color printer.

For color printers in particular, a color space conversion is usually performed on an image prior to its being printed. A color space is a color model that is used to represent the colors of an image. The typical color space for display purposes is red-green-blue (RGB), whereas a type of color space used for printing purposes is cyan-magenta-yellow (CMY). By combining the constituent colors of a color space in different ways, any desired color can be represented. Depending on the color model being used, combining the constituent colors of the model produce different results.

For example, the RGB color model for a display, such as a cathode-ray tube (CRT), specifies a given color as varying intensities of red, green, and blue. White is specified as the highest intensities of red, green, and blue, whereas black is specified as the absence of red, green, and blue. The CMY color model for a printer similarly specifies a given color as varying intensities of cyan, magenta, and yellow. However, black is specified as the highest intensities of cyan, magenta, and yellow, whereas white is specified as the absence of cyan, magenta, and yellow. For quality, economy, and other reasons, black ink is usually also used, such that the typical color space for printing purposes is in fact cyan-magenta-yellow-black (CMYK).

Conversion of a color value from an RGB color model to a CMY, CMYK, or other color model typically employs a three-dimensional look-up table (LUT). For each unique combination of red, green, and blue color values, the table provides corresponding values for cyan, magenta, yellow, and black. The table is three dimensional in that three different color values—the red value, the green value, and the blue value—dictate the corresponding values for cyan, magenta, yellow, and black. Once all the pixels of an image are converted from RGB to a given printer's resident color model, printing may occur.

Constructing a multi-dimensional LUT, however, can be quite laborious. Simply constructed LUT's may be used for basic printing, but to ensure high quality printing, more elaborate methodologies are employed for constructing LUT's. Because of the vast number of entries in a typical three-dimensional LUT, a method for constructing the LUT may start with a number of manually determined key or significant points, referred to as control points, and the remaining points are interpolated from the control points. Although this assists LUT construction somewhat, there can still be as many as four-thousand or more control points that have to be manually set, meaning that LUT construction is nevertheless still labor intensive.

For these described reasons, as well as other reasons, there is a need for the present invention.

SUMMARY OF THE INVENTION

The invention relates to determining the control points for constructing a lookup table from a first color space to a second color space. Black and white control points are determined based on an allowable total colorant amount and an absence of colorant, respectively. Control points between the black control point and the white control point are determined. A primary control point is determined for each of a number of first and secondary primary colors of the first and the second color spaces, based at least on the allowable total colorant amount. Control points between the white control point and the primary control point for each primary color are also determined. Finally, control points between the black control point and the primary control point for each primary color are determined.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 4 is a flowchart of a method for constructing a one-dimensional linearization LUT, according to an embodiment of the invention.

FIG. 6 is a flowchart of a method for determining control points to be used in constructing a multi-dimensional LUT, according to an embodiment of the invention.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
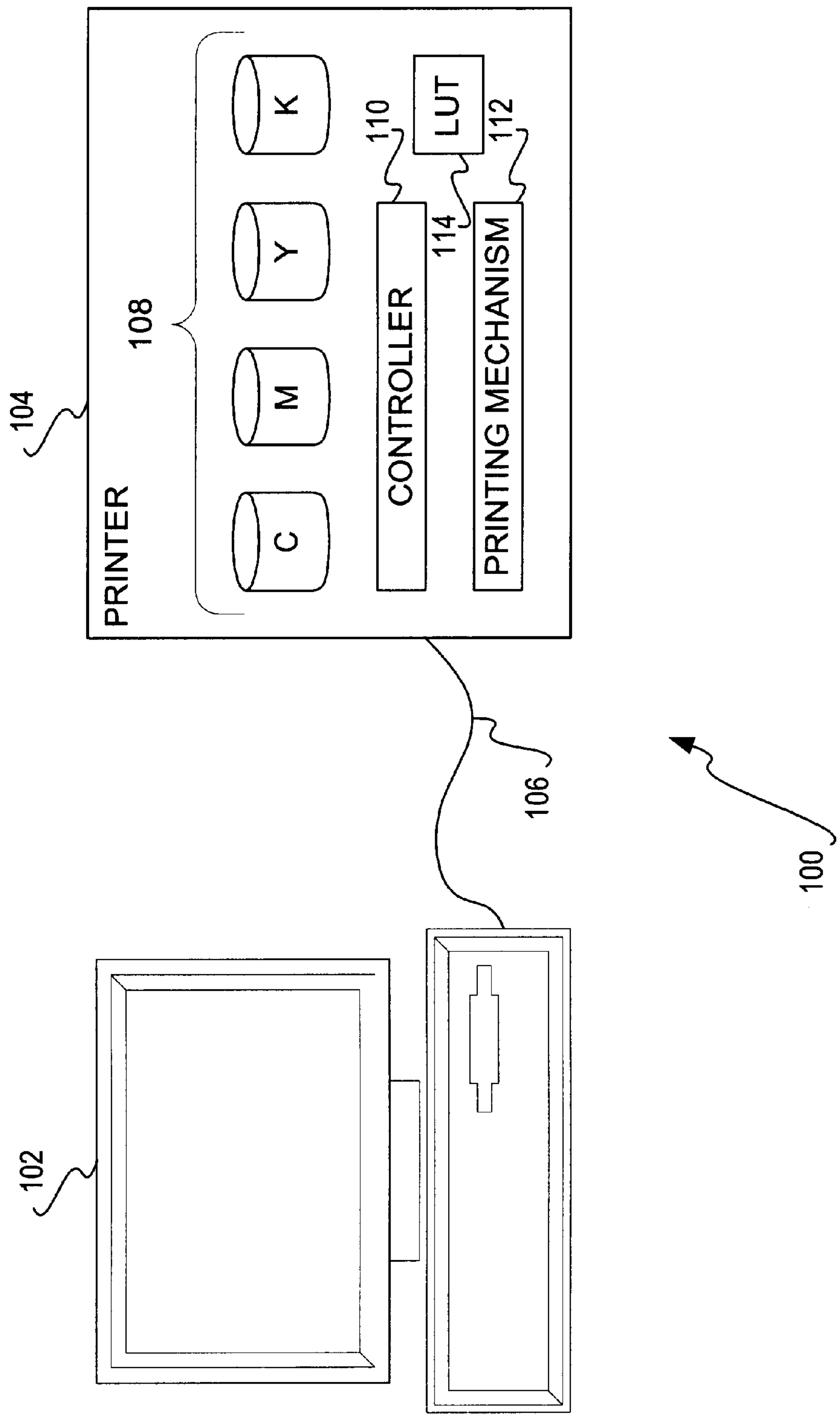
FIG. 1 is a diagram of a computerized device-printer system in conjunction with which embodiments of the invention may be practiced.

FIG. 1 shows a system 100 in accordance with which embodiments of the invention may be practiced. The system 100 includes a computerized device 102 and a printer 104 communicatively coupled to one another via an interconnect 106. The computerized device 102 may be a desktop computer, a laptop computer, a handheld computer, a personal-digital assistance (PDA) device, a cellular or wireless phone, or another type of computerized device.

The device 102 generates what is broadly referred to as an image to be communicated to the printer 104 over the interconnect 106 for printing. The image may be a word processing file, a web page, a graphics file, or any other type of entity or file that can be printed by the printer 104. The image has its colors specified in accordance with a color space, such as a red-green-blue (RGB) color space. The interconnect 106 is a broad term that encompasses a wired cable direct connection between the device 102 and the printer 104, a wireless connection between the device 102 and the printer 104, a network to which both the device 102 and the printer 104 are connected, as well as any other type of mechanism allowing the device 102 to communicate with the printer 104.

The printer 104 includes a number of colorants 108, a controller 110, a printing mechanism 112, and a multi-dimensional look-up table (LUT) 114. The printer 104 may include other components besides those shown in FIG. 1. The printer 104 may be an inkjet printer, a laser printer, or another type of printer. The printing mechanism 112 therefore corresponds to the type of printer the printer 104 is. That is, the printing mechanism 112 may be an inkjet printing mechanism, a laser printing mechanism, or another type of printing mechanism. The printing mechanism 112 uses the colorants 108 to print the image received from the computerized device 102 onto media, such as paper or another type of media.

The term colorants 108 is used in a broad sense, and encompasses ink, toner, or other types of colorant used by the printing mechanism 112 to print onto the media. For instance, the colorant 108 may be ink where the printing mechanism 112 is an inkjet printing mechanism, and may be toner where the printing mechanism 112 is a laser printing mechanism. The colorant 108, as shown in FIG. 1, include the different colors cyan, magenta, yellow, and black, where the printer 104 prints according to a cyan-magenta-yellow-black (CMYK) color space. The printer 104 may print according to other types of color spaces, however. As one example only, the cyan-magenta-yellow-black-light cyan-light magenta color space may also be utilized.

The controller 110 may include a processor and/or firmware, and processes the image received from the computerized device 102 over the interconnect 106 for printing by the printing mechanism 112 onto the media. For instance, where the image received is according to a display RGB color space, the controller 110 may initially convert the image to a printer RGB color space, or presumptively assume that the image is in accordance with the printer RGB color space. The latter presumption is not entirely accurate, since a display RGB color space and a printer RGB color space are two different device color spaces. The controller 110 then converts the image to the printer CMYK color space in accordance with the multi-dimensional LUT 114. Where the color space conversion process is from an RGB color space, the multi-dimensional LUT 114 is a three-dimensional LUT, since there is an entry within the table preferably for each unique combination of red, green, and blue color values.

For example, the color space conversion process typically involves converting the RGB color space color values (red, green, blue) of the pixels of the image to the CMYK color space color values (cyan, magenta, yellow, black). This is accomplished by looking up the color values (red, green, blue) in the LUT 114 to determine the corresponding color values (cyan, magenta, yellow, black). The color values (red, green, blue) describe the color value of a pixel of the image for display or other purposes, such as in accordance with a printer RGB color space. By comparison, the color values (cyan, magenta, yellow, black) describe the color value of a pixel of the image for printing purposes, indicating the relative amount of each of the colorants 108 to be used to print the pixel of the image onto the media.

After color space conversion from a first color space, such as the printer RGB color space, to a second color space, such as the printer CMYK color space, the image is ready for printing onto the media by the printing mechanism 112. Other conversion and formatting processes may also be performed in addition to this color space conversion. Furthermore, although the color space conversion is described and shown in FIG. 1 as being performed within the printer 104, it can also be performed by a host device, such as the computerized device 102, or another device not shown in FIG. 1. For example, a print server may receive images for printing from devices such as the computerized device 102, and perform the color space conversion and other conversions to ready the images for printing by the printer 104.

Figure 2:
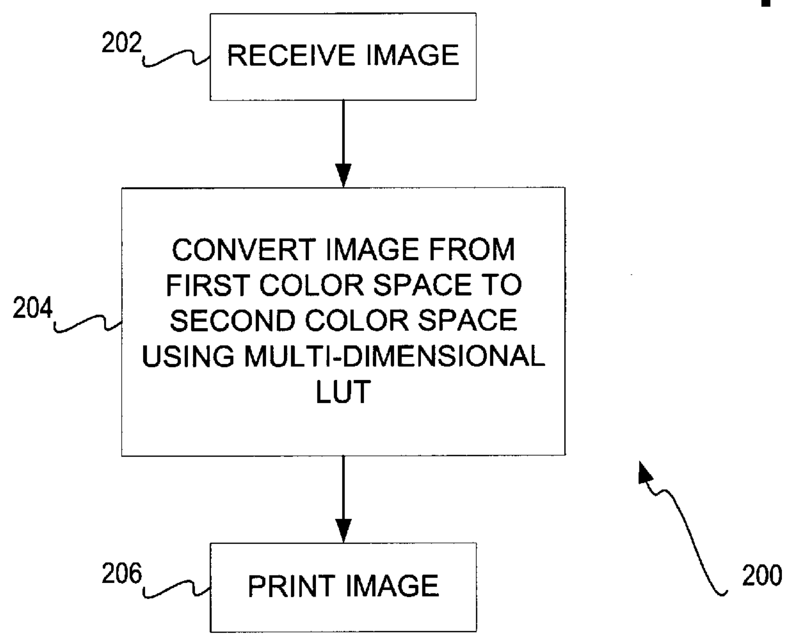
FIG. 2 is a flowchart of a method of an example information flow from a computerized device to a printer, in conjunction with which embodiments of the invention may be practiced.

FIG. 2 shows an example information flow from a host device to a printer as the method 200, in conjunction with which embodiments of the invention may be practiced. The host device may be the computerized device 102 of FIG. 1, whereas the printer may be the printer 104 of FIG. 1. The method 200 may be implemented as a computer program stored on a computer-readable medium, such as firmware, a floppy disk, a CD-ROM, and so on. Such a computer program is preferably executed by a processor of the printer and/or the host device.

First, the printer receives an image from the computerized device (202). The printer, potentially among other conversion and processing, converts the image from a first color space to a second color space, using a multi-dimensional LUT (204). For example, the conversion may be a printer RGB color space to a printer CMYK color space conversion. Finally, the printer prints the image (206). The method 200 is an example only, and other information flows are also amenable to the invention. For example, the color space conversion may be performed by the host device.

Constructing a Multi-dimensional Look-up Table

Figure 3:
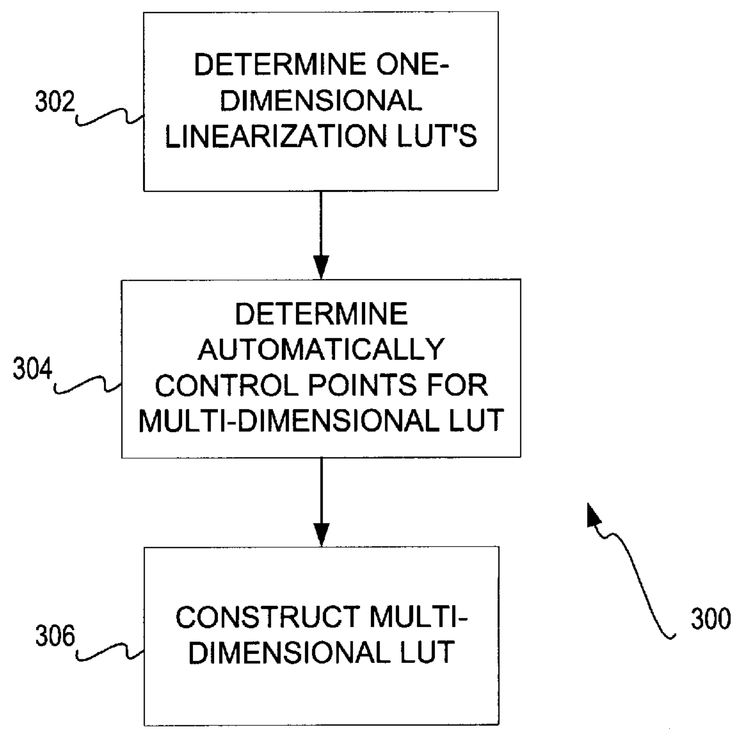
FIG. 3 is a flowchart of a method for constructing a multi-dimensional look-up table (LUT), according to an embodiment of the invention.

FIG. 3 shows a method 300 for constructing a multi-dimensional look-up table (LUT) for performing a color space conversion, according to an embodiment of the invention. A system can be constructed to perform the method 300, where each part of the method 300, such as 302, 304, and 306, is implemented as the same or different part of the system, and can be considered the means for performing its respective functionality. First, a one-dimensional linearization LUT is constructed for each color channel of the printer (302). A color channel, or color plane, contains all the information of a given color for a given image. There is a color channel, or color plane, for each colorant available within a printer. For instance, a color printer having four colors of colorant (cyan, magenta, yellow, and black) would have four color channels, or color planes.

The one-dimensional linearization LUT's ensure that linear color intensities, such as lightness, density, and so on, can be printed for each color channel. For example, linearized color intensities of 0 through 100% of each of cyan, magenta, yellow, and black may be desired. A color intensity of 50%, for example, may not exactly require 50% maximum colorant output, however. A one-dimensional linearization LUT linearizes the intensity of a color channel so that an appropriate colorant output is given for each device color value. A one-dimensional linearization LUT thus specifies for a linearized device value how much colorant should be output by the printer. It is one-dimensional in that only one input value, the desired color intensity, determines the output value. Specific details for constructing the one-dimensional linearization LUT's are provided in a subsequent section of the detailed description.

The method 300 next automatically determines control points for the multi-dimensional LUT (304). The control points are generally defined as the key or significant points of the multi-dimensional LUT, from which the other points of the LUT can be interpolated or otherwise determined. The control points are automatically determined, preferably based on the one-dimensional linearization LUT's that have been determined, as well as one or more gray component replacement (GCR) and/or other parameters.

The GCR parameters specify, for instance, at what intensity or value black colorant is to replace equal intensities or values of the other colorants. Equal values of cyan, magenta, and yellow colorants, for example, yield gray when combined. However, a corresponding value of black colorant also yields gray. Therefore, the GCR parameters specify the value at which black colorant replaces equal values of the other colorants for adding a gray component to a desired color value. The GCR parameters can also specify the maximum colorant amount of all the combined colorants that is to be output for a given pixel of an image, in order to avoid over-saturation of colorant on media. The GCR parameters can additionally specify the maximum black colorant that is to be output for a given pixel of an image so as to avoid over-saturation of specifically the black colorant on the media.

In one embodiment, a black control point is determined as the maximum value of black colorant based at least on the allowable total colorant amount, whereas a white control point is determined as the absence of any colorant. Control points between the black and the white control points are determined using the one-dimensional linearization LUT's and GCR parameters. Primary control points for all the primary colors of the color spaces from which and to which the multi-dimensional LUT provides conversion are determined as the maximum values of colorants based at least on the allowable total colorant amount. Primary colors include first primary colors and secondary primary colors, the former each utilizing a single colorant of the printer, and the latter utilizing two colorants of the printer. Control points are determined from each of the white and the black control points to each of the primary control points. Specific details for automatically determining the control points are provided in a subsequent section of the detailed description.

Finally, the method 300 constructs the multi-dimensional LUT used for color space conversion (306). The multi-dimensional LUT is constructed from the control points that have been automatically determined. Preferably, the multi-dimensional LUT is constructed by interpolating remaining entries of the multi-dimensional LUT from the control points that have been automatically determined. This can include linear (one-dimensional), planar (two-dimensional), and/or spatial (three-dimensional) interpolation. In one specific embodiment, the construction of the multi-dimensional LUT is accomplished as described in U.S. Pat. No. 5,982,990, entitled "Method and Apparatus for Converting Color Space." However, alternative approaches for constructing the multi-dimensional LUT from the automatically determined control points may also be used.

Constructing One-dimensional Linearization Look-up Table

FIG. 4 shows a method 400 for constructing a one-dimensional linearization look-up table (LUT), according to an embodiment of the invention. A one-dimensional linearization LUT is preferably constructed for each color channel of the printer. That is, a one-dimensional linearization LUT is preferably constructed for each color channel to which an image is converted for printing. For example, this color space may be cyan-magenta-yellow-black (CMYK), such that a one-dimensional linearization LUT is constructed for each color cyan, magenta, yellow, and black.

First, the printer for which a three-dimensional LUT is to be constructed prints a target sample that has varying intensities at each color of the printer's color space (402). For instance, the target sample may have portions at which each color is printed at 10% intensity, 20% intensity, and so on, through 100% intensity. Since the target sample is printed for the purpose of constructing one-dimensional linearization LUT's, there is an initially proportional correlation between the intensity printed and the amount of colorant used. For example, 10% of the maximum allowable colorant of each color is used to generate the 10% intensity portion of each color of the target sample, 20% of the maximum allowable colorant is used to generate the 20% intensity portion of the target sample, and so on.

Next, each intensity of each color of the target sample is measured to determine the actual visual intensities, such as lightness, density, and so on, of the colors printed (404). Measurement may be accomplished by using a spectrophotometer, a colorimeter, or another measurement device. Measuring the actual intensities of the colors printed allows for detecting variations between the actual intensities and the intended or desired intensities of the colors printed. For example, 10% of the maximum allowable colorant of the color cyan may actually yield only a visual color intensity of 8% as measured, or it may actually yield a visual color intensity of 13% as measured. In the former case, more than 10% of the maximum allowable colorant of the color cyan is needed to yield a visual color intensity of 10% as measured, whereas in the latter case, less than 10% of the maximum allowable colorant of the color cyan is needed to yield a visual color intensity of 10% as measured.

Therefore, the method 400 determines the colorant output necessary at each intensity (i.e., at each device color value) of each color to linearize the output intensities (406). That is, for each printed intensity of each color, the amount of colorant output is varied to ensure that the resulting visual intensities of each color are linear. For example, where the printed target sample printed intensities at 10% increments, the colorant output at each color is varied where the measured intensities are not at 10% increments. Intensities between the actually printed values may be determined through interpolation or another approach. Constructing such a one-dimensional LUT can subsequently be used so that, for instance, if a 90% intensity of the color black is desired—i.e., a dark gray—then the appropriate amount of black colorant is output by the printer to achieve this visual intensity, which may be more or less than 90% of the maximum allowable colorant.

Next, optionally a target sample is printed for composite gray at varying intensities between white and black (408). That is, for each intensity, colorant amounts corresponding to equal intensities of the cyan, magenta, and yellow are output, in accordance with their corresponding one-dimensional linearization LUT's, to yield gray. This is because combining cyan, magenta, and yellow yields gray, from a zero intensity that corresponds to white, to a maximum intensity that corresponds to black. This gray is referred to as composite gray because it results from mixing the colors cyan, magenta, and yellow, as opposed to non-composite gray, which results from outputting only black colorant.

The printed sample is then inspected to ensure that substantially gray balanced output in fact has occurred at equal color intensities (410). That is, for the combined colorant output by equal amounts of cyan, magenta, and yellow at a given intensity, the resulting printed sample should desirably appear substantially gray. If user inspection suggests that the printed sample at the given intensity is not substantially gray, then the colorant outputs of cyan, yellow, and/or magenta at this intensity within the corresponding one-dimensional linearization LUT's are modified so that gray does result (412).

Figure 5:
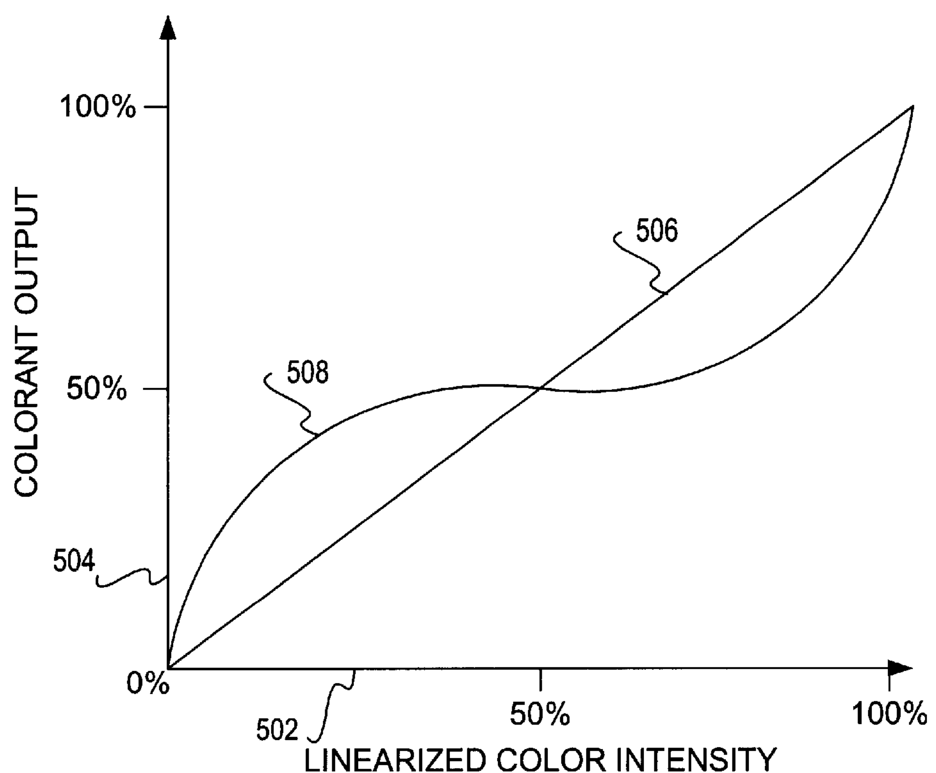
FIG. 5 is a graph of an example one-dimensional linearization LUT, according to an embodiment of the invention.

FIG. 5 shows an example one-dimensional linearization LUT that can be constructed according to an embodiment of the invention, such as by performing the method 400 of FIG. 4. The LUT of FIG. 5 is shown as a graph 500. The x-axis 502 indicates the linearized color intensity, as a percentage from 0 to 100% intensity, whereas the y-axis 504 indicates the amount of colorant output to achieve this intensity, as a percentage from 0 to 100% of the maximum allowable colorant. A line 506 shows an ideal but unlikely scenario in which colorant output is perfectly proportional to linearized color intensity, such that 10% of the maximum allowable colorant is output to provide a visual color intensity of 10%, 20% of the maximum allowable colorant is output to provide an intensity of 20%, and so on.

By comparison, the line 508 shows an example actual scenario in which colorant output is not perfectly proportional to color intensity. The line 508 is particularly determined by following the method 400 of FIG. 4, for instance. The line 508 shows that for the particular color that the graph 500 represents, for linearized color intensities less than 50%, a corresponding greater percentage of the maximum allowable colorant must be output to achieve the desired color intensities. Furthermore, for linearized color intensities greater than 50%, a corresponding lesser percentage of the maximum allowable colorant must be output to achieve the desired color intensities. The graph 500 of FIG. 5, including the line 508, is for illustrative purposes only, however, and does not necessarily represent an actual one-dimensional linearization LUT.

Automatically Determining Control Points for Construing Multi-dimensional Look-up Table FIG. 6 shows a method 600 for determining automatically the control points from which a multi-dimensional look-up table (LUT) can be constructed, according to an embodiment of the invention. As has been indicated, the control points generally are the key or significant points from which the other points of the multi-dimensional LUT may be determined, such as by interpolation or another approach. The multi-dimensional LUT is for conversion of colors from one color space to another color space, such as from a printer red-green-blue (RGB) color space to a printer cyan-magenta-yellow-black (CMYK) color space. The method 600 preferably utilizes the one-dimensional linearization LUT's that have been constructed, as well as various of the gray component replacement (GCR) parameters.

First, a black control point is determined (602), based on the maximum allowable total colorant amount and the maximum black colorant amount. That is, the black control point is determined based on the maximum allowable value for black and the highest allowable cyan, magenta, and yellow values for balanced composite black with the constraint of maximum allowable total colorant. Balanced composite black results from the colorant amounts corresponding to the maximum intensities of cyan, magenta, and yellow. This is because combining cyan, magenta, and yellow at their maximum intensities substantially results in black. This black is referred to as composite black because it results from mixing the maximum intensities of cyan, magenta, and yellow, as opposed to non-composite black, which results from outputting only black colorant. Next, the white control point is determined (604), as a complete absence of colorant. Thus, the value of the white control point is zero for all values cyan, magenta, yellow and black.

Next, a number of control points between the black control point and the white control point are determined (606). For instance, seventeen additional control points may be determined. The gray component replacement (GCR) parameters specify at which intensity black replaces equal intensities of cyan, yellow, and magenta for gray values. The gray values darker than the intensity defined by a GCR parameter are represented by cyan, magenta, yellow, and black, and at and lighter than this intensity are represented by cyan, magenta, and yellow without the black colorant.

For example, if black replaces equal amounts of cyan, yellow, and magenta beginning at an intensity of 20%, then for values less than 20% intensity, the control points between the black and the white control points are specified using equal intensities of cyan, magenta, and yellow, with a zero intensity of black. The actual values of cyan, magenta, and yellow at these intensities are then determined using the corresponding one-dimensional linearization LUT's for these colors, and proportionally reduced based on the total amount of colorant allowed. At values at or greater than 20%, the control points between the black and the white control points are specified using black, cyan, magenta, and yellow. The actual values of cyan, magenta, yellow, and black at these intensities are determined using the corresponding one-dimensional linearization LUT's and GCR parameters.

A primary control point for each primary color, such as cyan, magenta, yellow, red, green, and blue, is then determined (608). It is noted that first primary colors utilize only a single colorant, and thus correspond to the color channels of the printer. Conversely, secondary primary colors utilize two colorants. In the case of conversion from a printer RGB color space to a printer CMYK color space, these include the first primary colors cyan, magenta, and yellow from the printer CMYK color space, and the secondary primary colors red, green, and blue from the printer RGB color space that are mixed using the first primary colors. Primary control points for the three first primary colors are set using their corresponding one-dimensional linearization LUT's at maximum intensity, as constrained by the total amount of colorants allowed. That is, the primary control points for the primary colors cyan, magenta, and yellow only have non-zero values for cyan, magenta, and yellow, respectively.

By comparison, the primary control points for the secondary primary colors red, green, and blue have two non-zero values. The color red is formed by combining yellow and magenta, the color green by combining cyan and yellow, and the color blue by combining cyan and magenta. Each of these primary control points is determined by determining the value of each of the two constituent colors for maximum intensity with the appropriate one-dimensional LUT, and then reducing the values based on the total amount of colorant allowed if necessary. For example, for the color red, the values of yellow and magenta corresponding to their maximum intensities on the yellow and magenta one-dimensional linearization LUT's are determined, and reduced if these values when combined exceed the total amount of colorants allowed.

Next, the method 600 determines a number of control points between the white control point and each primary control point (610). For instance, seventeen control points between the white control point and each primary control point may be determined. Preferably, this is accomplished by linearly interpolating the additional control points from between the white control point and each primary control point in the printer CMYK space. For cyan, magenta, and yellow, the additional control points between the primary control points for these colors and the white control point can alternatively be determined from the one-dimensional linearization LUT's for these colors.

The method 600 also determines a number of control points between the black control point and each primary control point (612). As before, seventeen control points may be determined between the black control point and each primary control point. In one embodiment, these additional control points are determined by solving the following set of equations:

$$C_i = \frac{i}{n-1} C_k + C_0 \tag{1}$$
$$M_i = \frac{i}{n-1} M_k + M_0$$
$$Y_i = \frac{i}{n-1} Y_k + Y_0$$
$$K_i = \frac{i}{n-1} K_k + K_0$$

In this set of equations, the black control point is represented by the values ($C_k$, $M_k$, $Y_k$, $K_k$), the primary control point is represented by the values ($C_0$, $M_0$, $Y_0$, $K_0$), and the third control point—that is, a control point between the black control point and the primary control point—is represented by the values ($C_i$, $M_i$, $Y_i$, $K_i$). n is the size of the three-dimensional LUT, such as 17. i is incremented from one to the total number of additional control points to bet determined. $K_0$ is set to zero since it represents the black value for a primary color, and thus is zero.

For the cyan primary control point, only the value $C_0$ is non-zero. Similarly, for the magenta and the yellow primary control points, only the values $M_0$ and $Y_0$, respectively, are non-zero. For the red primary control point, the values $C_0$ and $K_0$ are zero. Similarly, for the green and the blue primary control points, the values $M_0$ and $K_0$ and the values $Y_0$ and $K_0$, respectively, are zero. The factor $i/n-1$ in the set of equations is a preferred ratio derived by linear interpolation, and may be varied in alternate embodiments of the invention. For each of these additional control points determined, preferably the constituent color values are proportionally reduced if the total colorant usage exceeds the maximum allowable colorant.

The determination of the control points in 602, 604, 606, 608, 610, and 612 of the method 600 results in a mono-color ramp for each of the first and secondary primary colors. Where conversion is to be accomplished from a printer RGB color space to a printer CMYK color space, there are thus seven such ramps, one for each of the colors red, green, blue, cyan, magenta, yellow, and black. For each of the primary colors, each ramp specifies control points from the white control point to the primary control point and from the primary control point to the black control point. For black, the mono-color ramp specifies control points from the white control point to the black control point.

Figure 7:
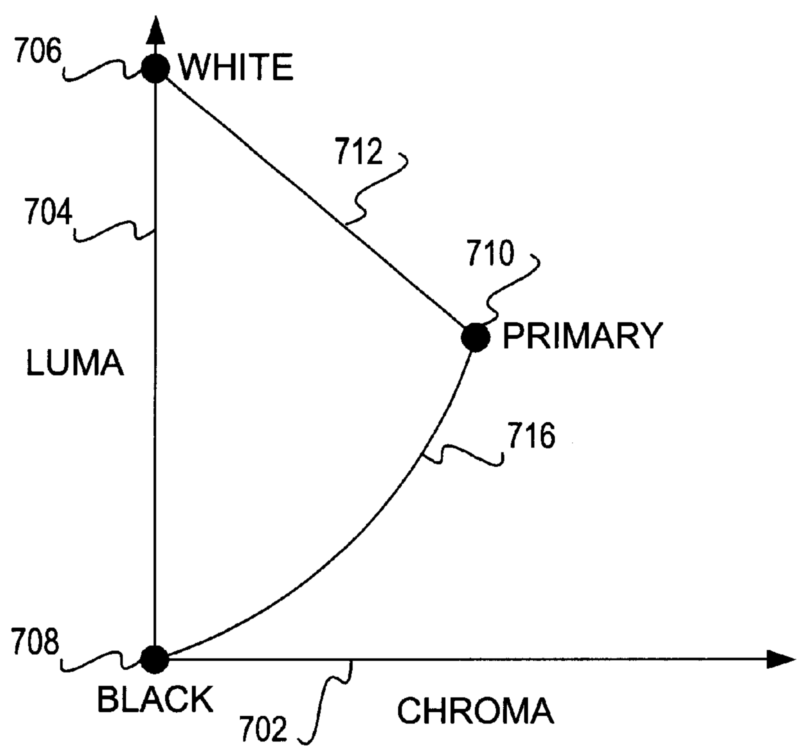
FIG. 7 is a graph of an example mono-color ramp for a primary color, according to an embodiment of the invention.

FIG. 7 shows a graph 700 of an example mono-color ramp for one of the primary colors, according to an embodiment of the invention. The mono-color ramp may also be referred to as a color leaf. The x-axis 702 measures chroma, or chrominance or color, whereas the y-axis 704 measures luma, or luminance or lightness. The white control point 706 thus has maximum luma and no chroma, whereas the black control point 708 has minimum luma and very small or no chroma. The primary control point 710 for a given primary color has maximum chroma, and a certain amount of luma. The points 706, 708, and 710 are determined by performing 602, 604, and 608, respectively, of the method 600 of FIG. 6. The line 712 of FIG. 7 includes the control points between the white control point 706 and the primary control point 710. These control points are determined by performing 610 of the method 600 of FIG. 6. The line 716 of FIG. 7 is determined by performing 612 of the method 600 of FIG. 6.

Referring back to FIG. 6, the method 600 is finished by optionally modifying control points relating to red and yellow colors (614). This is preferably performed to reduce skin-tone graininess that may otherwise be presented within the multi-dimensional LUT to be constructed if these control points are not modified. In particular, control points in this red and yellow region are modified by using a lesser predetermined amount of black colorant, and instead increasing the amount of cyan, magenta, and yellow colorants to accommodate for the reduction in black colorant. That is, the black value of such control points is reduced, and the cyan, magenta, and yellow values of such control points are correspondingly increased.

Conclusion

It is noted that, although specific embodiments have been illustrated and described herein, it will be appreciated by those of ordinary skill in the art that any arrangement is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A method for determining a plurality of control points for constructing a multi-dimensional look-up table (LUT) for conversion from a first color space to a second color space comprising:

determining a black control point based at least on an allowable total colorant amount;

determining a white control point as an absence of colorant;

determining a plurality of first control points between the black control point and the white control point;

determining a primary control point for each of first and secondary primary colors of the first and the second color spaces based at least on the allowable total colorant amount;

determining a plurality of second control points between the white control point and the primary control point for each of the first and the secondary primary colors; and, determining a plurality of third control points between the black control point and the primary control point for each of the first and the secondary primary colors.

2. The method of claim 1, further comprising modifying those of the pluralities of second and third control points relating to yellow and red colors of the first and the secondary primary colors to reduce skin-tone color graininess.

3. The method of claim 1, wherein determining the black control point is further based at least on a maximum black colorant amount.

4. The method of claim 1, wherein determining the black control point is further based at least on one or more gray component replacement (GCR) parameters.

5. The method of claim 4, wherein the one or more GCR parameters comprise at least one of: the total allowable colorant, the maximum black colorant amount, and a value at which black colorant begins to replace colored ink.

6. The method of claim 1, wherein determining the plurality of first control points is based at least on a one-dimensional black linearization LUT.

7. The method of claim 1, wherein determining the plurality of first control points is based at least on one or more gray component replacement (GCR) parameters.

8. The method of claim 1, wherein determining the plurality of second control points comprises, for the primary control point for each of the first and the secondary primary colors, linearly interpolating the plurality of second control points between the white control point and the primary control point.

9. The method of claim 1, wherein determining the plurality of third control points comprises, for the primary control point for each of the first and the secondary primary colors, interpolating the plurality of third control points based on the black control point and the primary control point.

10. The method of claim 9, wherein interpolating the plurality of third control points based on the black control point and the primary control point is in accordance with:

$$C_i = \frac{i}{n-1} C_k + C_0$$

$$M_i = \frac{i}{n-1} M_k + M_0$$

$$Y_i = \frac{i}{n-1} Y_k + Y_0$$

$$K_i = \frac{i}{n-1} K_k + K_0,$$

where ($C_k$, $M_k$, $Y_k$, $K_k$) represents the black control point, ($C_0$, $M_0$, $Y_0$, $K_0$) represents the primary control point, ($C_i$, $M_i$, $Y_i$, $K_i$) represents each third control point, n is a size of the three-dimensional LUT, and i is a counter counting through the plurality of third control points from 1 to n.

11. The method of claim 1, wherein the first color space comprises a printer red-green-blue (RGB) color space and the second color space comprises a printer cyan-magenta-yellow-black (CMYK) color space, such that the first primary colors comprise cyan, magenta, and yellow, and the secondary primary colors comprise red, green, and blue.

12. The method of claim 1, wherein the second color space comprises one of a cyan-magenta-yellow-black (CMYK) color space and a cyan-magenta-yellow-black-light cyan-light magenta color space.

13. The method of claim 1, wherein the allowable total colorant amount comprises one of an allowable total ink amount and an allowable total toner amount, and the absence of colorant comprises one of an absence of ink and an absence of toner.

14. A method for determining a plurality of control points for constructing a multi-dimensional look-up table (LUT) for conversion from a first color space to a second color space comprising:

determining a primary control point for each of first and second primary colors of the first and the second color spaces based at least on an allowable total colorant amount;

determining a plurality of first control points between a white control point and the primary control point for each of the first and the secondary primary colors; and, determining a plurality of second control points between a black control point and the primary control point for each of the first and the second primary colors.

15. The method of claim 14, further initially comprising:

determining the black control point based at least on the allowable total colorant amount; and, determining the white control point as an absence of colorant.

16. The method of claim 14, further comprising determining a plurality of third control points between the black control point and the white control point.

17. A printer having a multi-dimensional look-up table (LUT) for conversion from a first color space to a second color space, the LUT constructed by performing a method comprising:

determining automatically a plurality of control points including a black control point, a white control point, and a plurality of primary control points for first and secondary primary colors of the first and the second color spaces; and, constructing the multi-dimensional LUT based on the plurality of control points as automatically determined.

18. The printer of claim 17, the method further initially comprising determining a plurality of one-dimensional linearization LUT's for the first primary colors and for black, wherein determining automatically the plurality of control points is based at least on the plurality of one-dimensional linearization LUT's.

19. The printer of claim 18, wherein determining the plurality of one-dimensional linearization LUT's for the first primary colors and for black comprises:

printing a target sample for a plurality of intensities of each color of the first primary colors and black;

measuring the target sample at each intensity of each color of the first primary colors and black; and, determining a colorant output at each intensity of each color of the first primary colors and black to linearize the plurality of intensities of each color of the first primary colors and black.

20. The printer of claim 19, wherein determining the plurality of one-dimensional linearization LUT's for the first primary colors and black further comprises varying the colorant output at each intensity of each first primary color to render substantially gray balanced output of a combination of equal amounts of the first primary colors at each intensity.

21. The printer of claim 19, wherein measuring the target sample comprises using one of a spectrophotometer and a calorimeter.

22. The printer of claim 17, wherein determining automatically the plurality of control points is based at least on one or more gray component replacement (GCR) parameters.

23. The printer of claim 17, wherein determining automatically the plurality of control points comprises:

determining the black control point based at least on an allowable total colorant amount;

determining the white control point as an absence of colorant;

determining those of the plurality of control points between the black control point and the white control point;

determining the primary control point for each of the first and the secondary primary colors based at least on the allowable total colorant amount;

determining those of the plurality of control points between the white control point and the primary control point for each of the first and the secondary primary colors; and, determining those of the plurality of control points between the black control point and the primary control point for each of the first and the secondary primary colors.

24. The printer of claim 17, wherein the first color space comprises a printer red-green-blue (RGB) color space and the second color space comprises a printer cyan-magenta-yellow-black (CMYK) color space, such that the first primary colors comprise cyan, magenta, and yellow, and the secondary primary colors comprise red, green, and blue.

25. The printer of claim 17, wherein the second color space comprises one of a cyan-magenta-yellow-black (CMYK) color space and a cyan-magenta-yellow-black-light cyan-light magenta color space.

26. The printer of claim 17, wherein the printer is one of an inkjet printer and a laser printer.

27. A system for constructing a multi-dimensional look-up table (LUT) for conversion from a first color space to a second color space comprising:

means for automatically determining a plurality of control points including a black control point, a white control point, and a plurality of primary control points for first and secondary primary colors of the first and the second color spaces; and, means for constructing the multi-dimensional LUT based on the plurality of control points.

28. The system of claim 27, further comprising means for determining a plurality of one-dimensional linearization LUT's for the first primary colors and for black, the one-dimensional linearization LUT's used to determine the plurality of control points.

29. The system of claim 27, wherein the first color space comprises a printer red-green-blue (RGB) color space and the second color space comprises a printer cyan-magenta-yellow-black (CMYK) color space.

30. The system of claim 27, wherein the second color space comprises one of a cyan-magenta-yellow-black (CMYK) color space and a cyan-magenta-yellow-black-light cyan-light magenta color space.

31. A system comprising:

a host device generating an image; and, a printer receiving the image and printing the image after conversion thereof from a first color space to a second color space in accordance with a multi-dimensional look-up table (LUT) previously constructed using automatically generated control points.

32. The system of claim 31, wherein the host device converts the image from the first color space to the second color space.

33. The system of claim 31, wherein the printer converts the image from the first color space to the second color space.

34. The system of claim 31, wherein the first color space comprises a printer red-green-blue (RGB) color space and the second color space comprises a printer cyan-magenta-yellow-black (CMYK) color space.

35. The system of claim 31, wherein the second color space comprises one of a cyan-magenta-yellow-black (CMYK) color space and a cyan-magenta-yellow-black-light cyan-light magenta color space.

36. The system of claim 31, wherein the printer is one of an inkjet printer and a laser printer.

37. A computer-readable medium having a computer program stored thereon to perform a method comprising:

receiving an image to be printed;

converting the image from a first color space to a second color space in accordance with a multi-dimensional look-up table (LUT) previously constructed using automatically generated control points; and, printing the image.

38. The medium of claim 37, wherein the first color space comprises a printer red-green-blue (RGB) color space and the second color space comprises a printer cyan-magenta-yellow-black (CMYK) color space.

39. The medium of claim 37, wherein the second color space comprises one of a cyan-magenta-yellow-black (CMYK) color space and a cyan-magenta-yellow-black-light cyan-light magenta color space.

40. The medium of claim 37, wherein printing the image comprises one of inkjet printing the image and laser printing the image.

* * * * *